(12) United States Patent
Bazot et al.

(10) Patent No.: US 8,838,711 B2
(45) Date of Patent: Sep. 16, 2014

(54) SHORT MESSAGE SERVICE SYSTEM

(75) Inventors: Philippe Bazot, Vence (FR); Jacques Cresp, Saint Jeannet (FR); Fabrice Livigni, Montauroux (FR); Olivier Oudot, Vallauris (FR); Richard Sert, Frejus (FR); Alain Siles, Vence (FR); Joel Viale, Vence (FR)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 13/276,694

(22) Filed: Oct. 19, 2011

(65) Prior Publication Data

US 2013/0086182 A1 Apr. 4, 2013

(30) Foreign Application Priority Data

Sep. 29, 2011 (EP) .................................... 11290451

(51) Int. Cl.
*G06F 15/173* (2006.01)
*H04L 12/58* (2006.01)
*H04L 29/08* (2006.01)

(52) U.S. Cl.
CPC .......... *H04L 51/18* (2013.01); *H04L 29/08072* (2013.01); *H04L 51/38* (2013.01)
USPC ............ 709/206; 709/220; 709/224; 711/103

(58) Field of Classification Search
USPC .......................................... 709/203; 455/466
See application file for complete search history.

(56) References Cited

U.S. PATENT DOCUMENTS

| 7,373,384 | B2 | 5/2008 | Bragado Carrasco et al. |
| 7,774,006 | B2 | 8/2010 | Huggett et al. |
| 8,306,021 | B2 * | 11/2012 | Lawson et al. ................ 370/352 |
| 8,373,538 | B1 * | 2/2013 | Hildner et al. ................ 340/3.1 |
| 2002/0091782 | A1 | 7/2002 | Benninghoff, III |
| 2005/0210256 | A1 | 9/2005 | Meier et al. |
| 2007/0167178 | A1 * | 7/2007 | Al-Harbi ....................... 455/466 |
| 2008/0132256 | A1 * | 6/2008 | Noldus ........................ 455/466 |
| 2011/0113182 | A1 * | 5/2011 | Reyes ........................... 711/102 |

FOREIGN PATENT DOCUMENTS

| DE | 102008033912 A1 | 1/2010 |
| EP | 1233584 A1 | 8/2002 |
| WO | 2010028341 A1 | 3/2010 |

OTHER PUBLICATIONS

"SMSC—Short Message Service Center" http://www.comviva.com/Resource%20Center/Collaterals/Comviva_PF_SMSC.pdf, 2009, 2 pages.
"Succeeding with SMS Today: Competition Demands Proven Components", http://www5.dialogic.com/products/signalingip_ss7components/docs/10171_SMS_Success.pdf, 2007, 8 pages.
Jones, "How to copy Voice Messages from a Cell Phone", http://www.ehow.com/how_5814035_copy-voice-messages-cell-phone.html, 2011, 4 pages.
"Certified SMS", Lleida.net, http://www.lleida.net/en/smscert.html, 2011, 1 page.

* cited by examiner

*Primary Examiner* — Khanh Dinh
(74) *Attorney, Agent, or Firm* — Frederique Lopez; Hoffman Warnick LLC

(57) ABSTRACT

A computer-implemented method and computer program for proving a short message service (SMS) message was sent and received. The computer-implemented method includes: designating a message type for the SMS message, wherein the message type includes a normal type and a legal type; in response to designating a legal type for the SMS message, changing a header for the SMS message, wherein the header indicates that the SMS message should be stored; storing the SMS message with a trusted authority; and sending the SMS message, from a sender, to a receiver.

19 Claims, 3 Drawing Sheets

SHORT MESSAGE SERVICE SYSTEM

TECHNICAL FIELD

The disclosure relates generally to short message service (SMS) messages, and more particularly, to a system for proving the sending of a SMS message.

BACKGROUND ART

Currently, users of devices can send messages to one another using SMS messages. SMS is a text messaging service component of many devices, including mobile communication devices. SMS uses standardized communications protocols that allow the exchange of short text messages between the devices.

However, after a person sends a SMS message to another party, the person is unable to prove that the SMS message was sent and who the SMS message was sent to. Further, the person is unable to prove when the SMS message was sent, the contents of the SMS, and that the SMS message was delivered to the other party.

SUMMARY OF THE INVENTION

In view of the problems and objects set forth above, the present invention provides proof of a SMS message. A method and computer program are provided that are capable of proving that a SMS message was sent to another party and delivered to the other party.

A first aspect of the invention provides a computer-implemented method of proving a short message service (SMS) message, the method comprising: designating a message type for the SMS message, wherein the message type includes a normal type and a legal type; in response to designating a legal type for the SMS message, changing a header for the SMS message, wherein the header indicates that the SMS message should be stored; storing the SMS message with a trusted authority; and sending the SMS message, from a sender, to a receiver.

A second aspect of the invention provides a system, comprising: a client application stored a computing device of a sender for: designating a type of a SMS message, the type including a normal type and a legal type; and in response to designating a legal type for the SMS message, changing a header for the SMS message, wherein the header indicates that the SMS message should be stored; a trusted authority for storing the SMS message; and a SMS service center for sending the SMS message to a receiver.

A third aspect of the invention provides a computer program comprising program code embodied in at least one computer-readable medium, which when executed, enables a computer system to prove a short message service (SMS) message, the method comprising: designating a message type for the SMS message, wherein the message type includes a normal type and a legal type; in response to designating a legal type for the SMS message, changing a header for the SMS message, wherein the header indicates that the SMS message should be stored; storing the SMS message with a trusted authority; and sending the SMS message, from a sender, to a receiver.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide for proving a SMS message. As used herein, unless otherwise noted, the term "set" means one or more (i.e., at least one) and the phrase "any solution" means any now known or later developed solution.

Currently, users of devices can send messages to one another using SMS messages. SMS is a text messaging service component of many devices, including mobile communication devices. SMS uses standardized communications protocols that allow the exchange of short text messages between the devices.

Other conventional channels of communication (e.g., electronic mail, facsimile, and standard postal mail) include mechanisms for proving that a document or communication was sent. However, after a person sends a SMS message to another party, the person is unable to prove that the SMS message was sent and who the SMS message was sent to. Further, the person is unable to prove when the SMS message was sent, the contents of the SMS, and that the SMS message was delivered to the other party.

Figure 1:
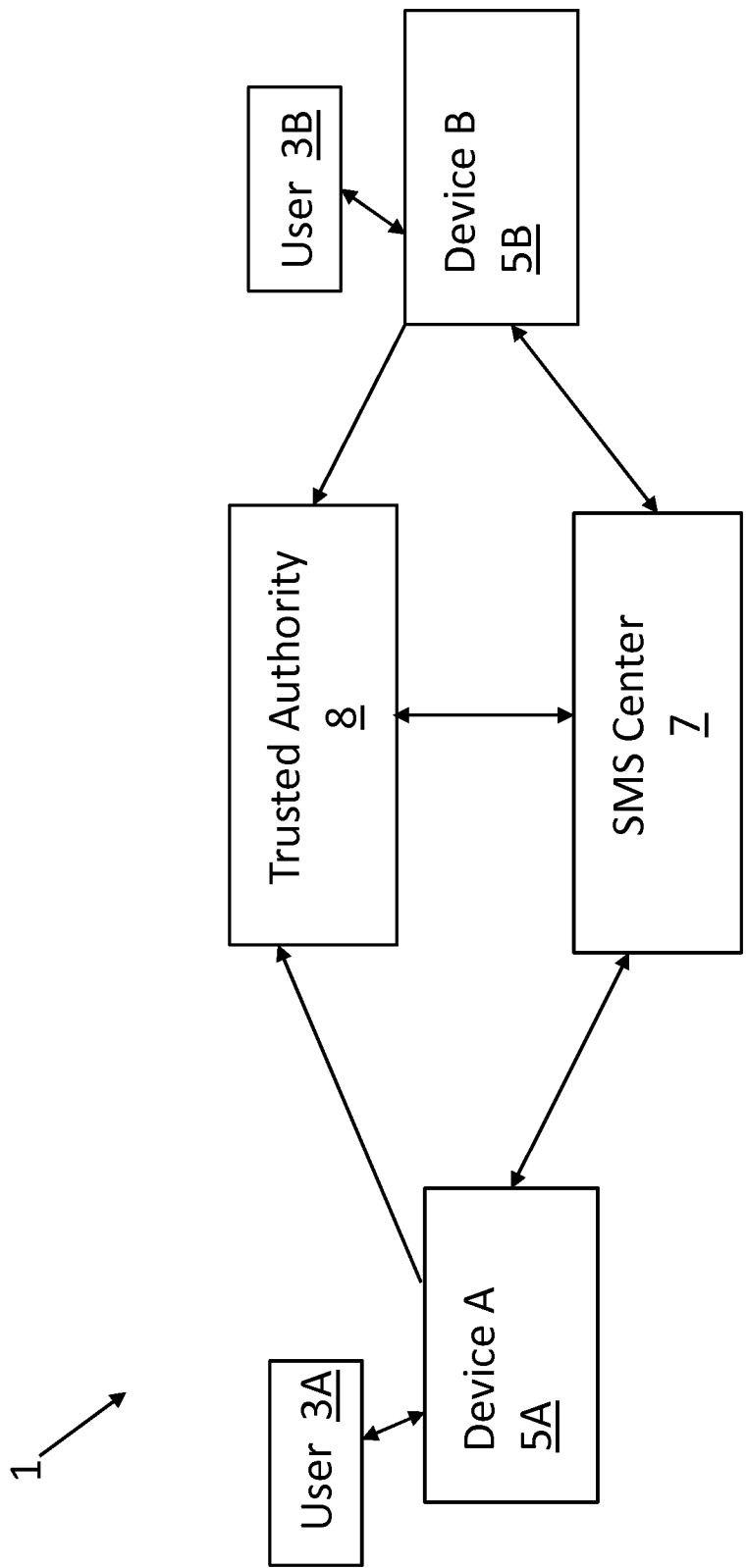
FIG. 1 shows a system according to embodiments of the invention.

Turning to the drawings, FIG. 1 shows a system 1 of a first device 5A and a second device 5B, each device controlled by a respective user 3A, 3B. Although only two devices 5A, 5B are shown in FIG. 1, it is understood that system 1 may include any number of devices and each device may be controlled by a respective user. Each device may be any now known or later developed device that is enabled to send SMS messages, such as, but not limited to a mobile phone or a smartphone.

Although the description below refers to the first device 5A sending a SMS message to the second device 5B, it is understood that it is only for exemplary purposes only, and that a SMS message may be sent from second device 5B to the first device 5A. Further, since system 1 may include any number of devices, it is understood that first device 5A (or second device 5B) may send a single SMS message to multiple devices, simultaneously.

Figure 2:
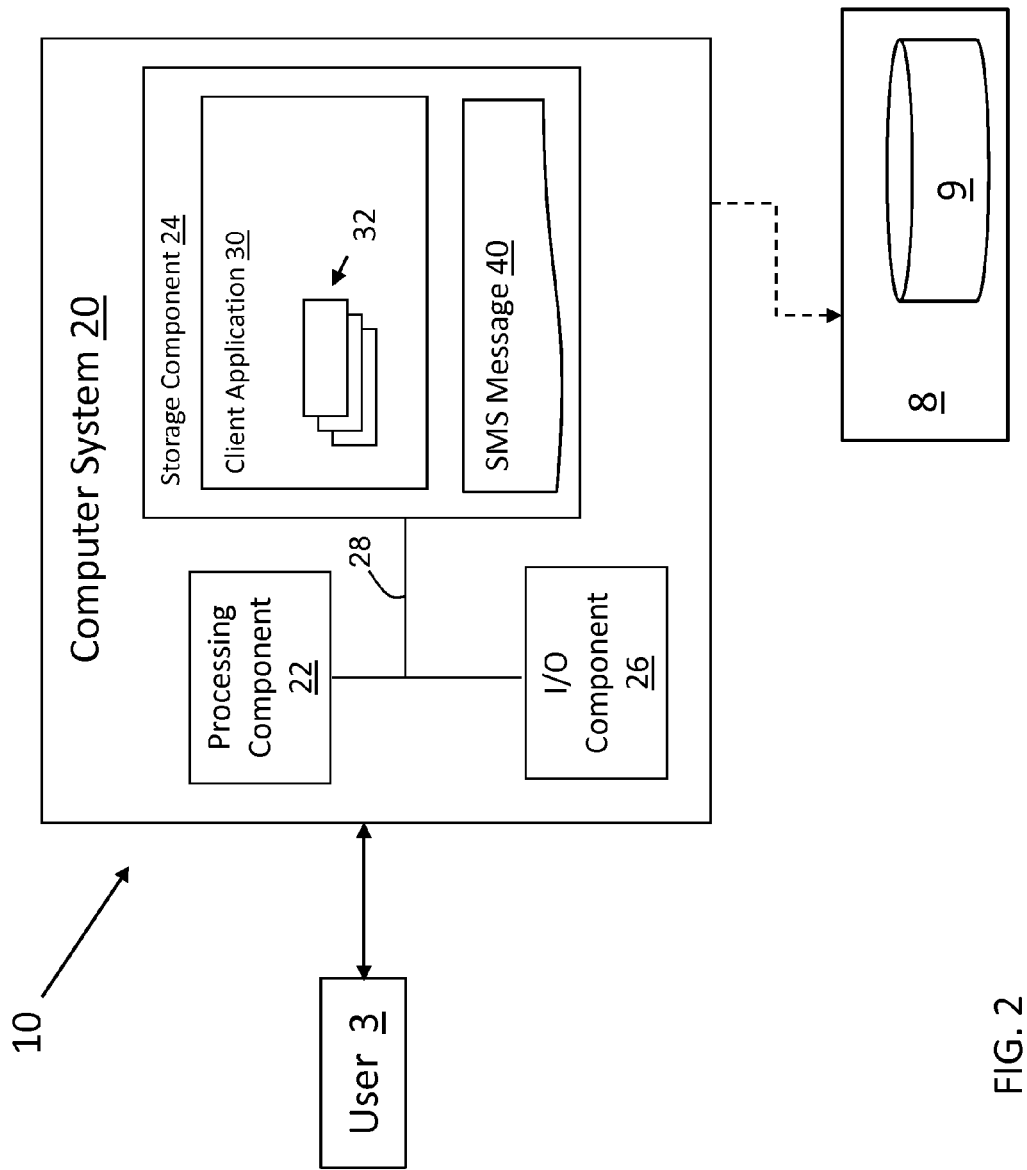
FIG. 2 shows an illustrative environment of a device according to embodiments of the invention.

Turning now to FIG. 2, and with continued reference to FIG. 1, an illustrative environment 10 for proving a SMS message according to embodiments of the invention is shown. To this extent, environment 10 includes a computer system 20 that can perform a process described herein in order to prove the sending of a SMS message. That is, computer system 20 may be embodied within each device, e.g., first device 5A and second device 5B. In particular, computer system 20 is shown including a client application 30, which makes computer system 20 operable to prove the sending of a SMS message by performing a process described herein. It is understood that each device, e.g., first device 5A and second device 5B, includes a computer system 20, as described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as client application 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 3 to interact with computer system 20 and/or one or more communications devices to enable a system user 3 to communicate with computer system 20 using any type of communications link. To this extent, client application 30 can manage a set of interfaces (e.g., graphical user interface(s), application program interface, and/or the like) that enable human and/or system users 3 to interact with client application 30. Further, client application 30 can manage (e.g., store, retrieve, create, manipulate, organize, present, etc.) the data, the SMS message 40, using any solution.

In any event, computer system 20 can comprise one or more general purpose computing articles of manufacture (e.g., computing devices) capable of executing program code, such as client application 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, client application 30 can be embodied as any combination of system software and/or application software.

Further, client application 30 can be implemented using a set of modules 32. In this case, a module 32 can enable computer system 20 to perform a set of tasks used by client application 30, and can be separately developed and/or implemented apart from other portions of client application 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of client application 30 fixed thereon (e.g., one or more modules 32). However, it is understood that computer system 20 and client application 30 are only representative of various possible equivalent computer systems that may perform a process described herein. To this extent, in other embodiments, the functionality provided by computer system 20 and client application 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, client application 30 enables computer system 20 to prove the sending of a SMS message. The first device 5A will be used as an example to describe the details of client application 30; however, it is understood that these teachings can be applied to any device in system 1 (e.g., second device 5B).

Initially, each device, for example, the first device 5A, may be registered with a trusted authority 8. Trusted authority may be any third party computing device that includes a storage device 9 for storing information regarding the SMS message. The information regarding the SMS message may include, but is not limited to: the contents of the SMS message, the Mobile Subscriber Integrated Services Digital Network (MSISDN) number of both the sending device (e.g., the first device 5A) and the receiving device (e.g., the second device 5B), the International Mobile Equipment Identity (IMEI) number of the sending device (e.g., the first device 5A), the date and time the SMS message was sent, and the date and time the SMS message was received.

When a user, for example, the user 3A of the first device 5A, composes a SMS message 40 on the device to send to another user, for example, the user 3B of the second device 5B, a message type may be designated for the SMS message 40. The message type may either a normal type or a legal type. In the case that the user 3A designated the SMS message 40 as a legal type, client application 30 will be change a header (not shown) of the SMS message to indicate that the SMS message and information regarding the SMS message should be stored.

The header of the SMS message may include any form of indication that would communicate to the SMS Center 7 that the SMS message and information regarding the SMS message should be stored with the trusted authority, such as, but not limited to, a Boolean. Further, the header of the SMS message may include the amount of time that the trusted authority 8 should store the SMS message and information regarding the SMS message, and user identification, such as the MSISDN number or the IMEI number.

Once the SMS message 40 is sent out from the first device 5A, it is delivered to the SMS center 7. The SMS center 7 will receive the SMS message 40 and send the message to the intended recipients (e.g., second device 5B). If the header of the SMS message 40 indicates that the message is a legal type, then the contents of the SMS message 40 and any associated information regarding the SMS message 40 will also be sent from the SMS center 7 to the trusted authority 8 and stored in the storage component 9 of the trusted authority.

The trusted authority 8 may generate a certificate that proves that the SMS message 40 was sent by the first user 5A and delivered to the second user 5B. Each device 5A, 5B may include a graphical user interface (not shown) and the certificate may be displayed on the graphical user interface of the device that sent the SMS message 40, e.g., the first device 5A. Alternatively, a universal resource locator (URL) may be sent from the trusted authority 8 to sender device (the first device 5A), via the SMS Center 7. The URL may be sent via a SMS message. The URL may be used later on to retrieve the certificate to prove the sending of the SMS message 40.

Figure 3:
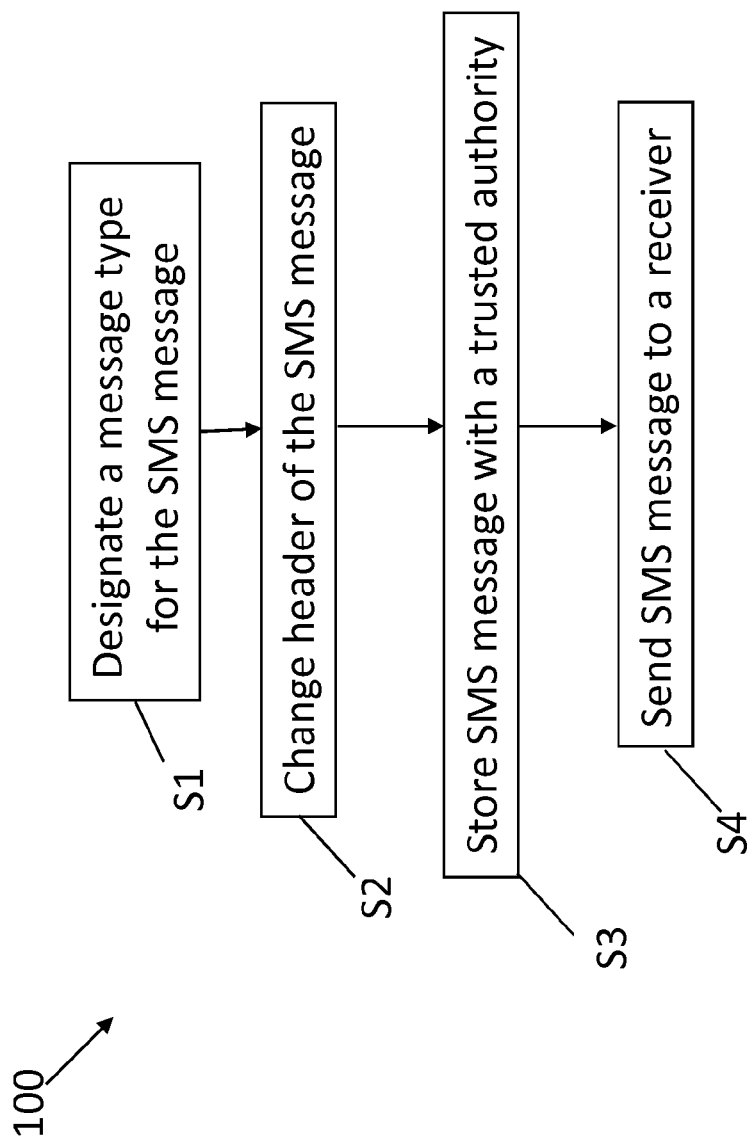
FIG. 3 shows a flow diagram of a computer-implemented method of proving a short message service (SMS) message according to embodiments of the invention.

Turning now to FIG. 3, and with continued reference to FIGS. 1 and 2, a flow diagram 100 of a computer-implemented method of proving a SMS message according to embodiments of the invention is shown. It is understood that, prior to the following, each device 5A, 5B within system 1 may be registered with the trusted authority 8.

At step S1, the sender device (the first device 5A) designates a message type for the SMS message 40. For example, the message type for the SMS message 40 may be either a legal type or normal type. If the SMS message 40 is designated as a normal type, then the SMS message 40 is sent to the SMS Center 7 and delivered to the intended recipient (i.e., second device 5B).

However, in response to designating a legal type for the SMS message 40, at step S2, the header of the SMS message 40 is changed to indicate that information regarding the SMS message 40 should be stored. The header of the SMS message 40 may also include the amount of time to store the SMS message 40 and information regarding the user (i.e., user 3A).

Next, at step S3, the SMS message 40 is stored within the storage component 9 of the trusted authority 8. As mentioned above, in addition to storing the SMS message 40, information regarding the SMS message 40 may also be stored. The information regarding the SMS message 40 may include, but is not limited to: the contents of the SMS message 40, the Mobile Subscriber Integrated Services Digital Network (MSISDN) number of both the sending device (e.g., the first device 5A) and the receiving device (e.g., the second device 5B), the International Mobile Equipment Identity (IMEI) number of the sending device (e.g., the first device 5A), the date and time the SMS message 40 was sent, and the date and time the SMS message 40 was received. Also, the amount of time to store the SMS message 40 that was indicated by the header of the SMS message 40 may also be stored. At step S4, the SMS message 40 is sent to the receiver (i.e., second device 5B).

While shown and described herein as a method and system for proving the sending of a SMS message, it is understood that aspects of the invention further provide various alternative embodiments. For example, in one embodiment, the invention provides a computer program fixed in at least one computer-readable medium, which when executed, enables a computer system to prove the sending of a SMS message. To this extent, the computer-readable medium includes program code, such as client application 30 (FIG. 2), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as client application 30 (FIG. 2), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of proving the sending of a SMS message. In this case, a computer system, such as computer system 20 (FIG. 2), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to prove the sending of a SMS message as described herein. In this case, the service provider can manage (e.g., create, maintain, support, etc.) a computer system, such as computer system 20 (FIG. 2), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of proving a short message service (SMS) message, the method comprising:

designating a message type for the SMS message, wherein the message type includes a normal type and a legal type, wherein the legal type SMS message designation indicates that the SMS message is to be sent from a sender to a receiver, and sent to a trusted authority for storage, and wherein the normal type SMS message designation indicates that the SMS message is to be sent from the sender to the receiver, and not sent to the trusted authority for storage;

in response to designating the normal type of the SMS message, sending the SMS message from the sender to the receiver; and in response to designating the legal type for the SMS message:
  changing a header for the SMS message to indicate that the SMS message should be stored;
  storing the SMS message with the trusted authority;
  sending the SMS message from the sender to the receiver;
  generating, by the trusted authority, a certificate indicating that the SMS message has been delivered to the receiver; and
  providing the certificate or a link to the certificate to the sender.

2. The computer-implemented method of claim 1, wherein the header for the SMS message includes an amount of time to store the SMS message with the trusted authority.

3. The computer-implemented method of claim 1, wherein the header includes a Boolean to indicate whether the SMS message should be stored with the trusted authority.

4. The computer-implemented method of claim 2, wherein the header for the SMS message includes a user identification.

5. The computer-implemented method of claim 1, further comprising registering a device of the sender with the trusted authority.

6. The computer-implemented method of claim 1, wherein a device of the sender includes a graphical user interface.

7. The computer-implemented method of claim 6, further comprising displaying a certification on the graphical user interface of the sender device to prove that that SMS message was sent by the sender and delivered to the receiver.

8. A system, comprising:
  a client application stored in a computing device of a sender device for:
    designating a type of a SMS message, the type including a normal type and a legal type, wherein the legal type SMS message designation indicates that the SMS message is to be sent from a sender to a receiver, and sent to a trusted authority for storage, and wherein the normal type SMS message designation indicates that the SMS message is to be sent from the sender to the receiver, and not sent to the trusted authority for storage;
  a SMS service center for, in response to designating the normal type of the SMS message, sending the SMS message from the sender to the receiver; and
  the SMS service center for, in response to designating the legal type for the SMS message:
    changing a header for the SMS message, to indicate that the SMS message should be stored;
    storing the SMS message with the trusted authority;
    sending the SMS message to the receiver; and
    providing a certificate generated by the trusted authority, or a link to the certificate, to the sender device, the certificate indicating that the SMS message has been delivered to the receiver.

9. The system of claim 8, wherein the header for the SMS message includes an amount of time to store the SMS message with the trusted authority.

10. The system of claim 9, wherein the header for the SMS message includes a user identification.

11. The system of claim 8, wherein the header includes a Boolean to indicate whether the SMS message should be stored with the trusted authority.

12. The system of claim 8, further comprising registering the sender device with the trusted authority.

13. The system of claim 12, further comprising displaying a certification on the graphical user interface of the sender device to prove that that SMS message was sent by the sender and delivered to the receiver.

14. The system of claim 8, wherein the sender device includes a graphical user interface.

15. A computer program comprising program code embodied in at least one non-transitory computer-readable medium, which when executed, enables a computer system to prove a short message service (SMS) message, the method comprising:
  designating a message type for the SMS message, wherein the message type includes a normal type and a legal type, wherein the legal type SMS message designation indicates that the SMS message is to be sent from a sender to a receiver, and sent to a trusted authority for storage, and wherein the normal type SMS message designation indicates that the SMS message is to be sent from the sender to the receiver, and not sent to the trusted authority for storage;
  in response to designating the normal type of the SMS message, sending the SMS message from the sender to the receiver; and
  in response to designating the legal type for the SMS message:
    changing a header for the SMS message to indicate that the SMS message should be stored;
    storing the SMS message with the trusted authority;
    sending the SMS message from the sender to the receiver;
    generating, by the trusted authority, a certificate indicating that the SMS message has been delivered to the receiver; and
    providing the certificate or a link to the certificate to the sender.

16. The computer program of claim 15, wherein the header for the SMS message includes an amount of time to store the SMS message with the trusted authority and a user identification.

17. The computer program of claim 15, wherein the header includes a Boolean to indicate whether the SMS message should be stored with the trusted authority.

18. The computer program of claim 15, further comprising registering a device of the sender with the trusted authority.

19. The computer program of claim 15, further comprising displaying a certification on a graphical user interface of the sender device to prove that that SMS message was sent by the sender device and delivered to the receiver.

* * * * *